(12) United States Patent
Saito et al.

(10) Patent No.: US 11,027,398 B2
(45) Date of Patent: Jun. 8, 2021

(54) GRINDING MATERIAL AND PRODUCTION METHOD OF GRINDING MATERIAL

(71) Applicant: BANDO CHEMICAL INDUSTRIES, LTD., Hyogo (JP)

(72) Inventors: Kazuo Saito, Kobe (JP); Kenji Shimoyama, Kobe (JP); Tomoki Iwanaga, Kobe (JP); Toshikazu Taura, Kobe (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 364 days.

(21) Appl. No.: 15/737,755

(22) PCT Filed: May 24, 2016

(86) PCT No.: PCT/JP2016/065327
§ 371 (c)(1),
(2) Date: Dec. 19, 2017

(87) PCT Pub. No.: WO2016/203914
PCT Pub. Date: Dec. 22, 2016

(65) Prior Publication Data
US 2018/0185985 A1 Jul. 5, 2018

(30) Foreign Application Priority Data
Jun. 19, 2015 (JP) .............................. JP2015-123882

(51) Int. Cl.
*B24D 3/02* (2006.01)
*B24D 11/00* (2006.01)
(Continued)

(52) U.S. Cl.
CPC .............. *B24D 3/346* (2013.01); *B24D 3/00* (2013.01); *B24D 3/04* (2013.01); *B24D 3/14* (2013.01);
(Continued)

(58) Field of Classification Search
USPC ........................................ 51/293, 307, 308
See application file for complete search history.

(56) References Cited

U.S. PATENT DOCUMENTS

| 2002/0019199 A1 | 2/2002 | Goers et al. | |
| 2007/0298240 A1* | 12/2007 | Gobena | B24B 9/065 428/323 |
| 2015/0052824 A1* | 2/2015 | Gebhardt | C04B 28/006 51/308 |

FOREIGN PATENT DOCUMENTS

| CN | 100357064 | 12/2007 |
| JP | H05111878 | 5/1993 |

(Continued)

OTHER PUBLICATIONS

"International Search Report (Form PCT/ISA/210) of PCT/JP2016/065327", dated Aug. 23, 2016, with English translation thereof, pp. 1-4.

*Primary Examiner* — James E McDonough
(74) *Attorney, Agent, or Firm* — JCIPRNET

(57) ABSTRACT

The purpose of the present invention is to provide a grinding material which has a superior grinding rate and planarizing accuracy, with the grinding rate being less likely to be reduced over a relatively long period of time. The present invention is directed to a grinding material including a base, a grinding layer overlaid on a front face side of the base and including grinding grains and a binder for the grinding grains, and an adhesion layer overlaid on a back face side of the base, in which the grinding grains are diamond grinding grains, a wear quantity of the grinding layer as determined by a Taber abrasion test is no less than 0.03 g and no greater than 0.18 g, and, an Asker D hardness measured from a front face side of the grinding layer is no less than 80° and no greater than 98°.

5 Claims, 1 Drawing Sheet

(51) Int. Cl.
  *B24D 3/00*     (2006.01)
  *C09K 3/14*     (2006.01)
  *B24D 3/34*     (2006.01)
  *B24D 3/04*     (2006.01)
  *B24D 13/14*    (2006.01)
  *B24D 11/02*    (2006.01)
  *B24D 3/14*     (2006.01)
  *B24D 18/00*    (2006.01)
  *C09C 1/68*     (2006.01)

(52) U.S. Cl.
  CPC ................ *B24D 3/34* (2013.01); *B24D 11/00* (2013.01); *B24D 11/02* (2013.01); *B24D 13/147* (2013.01); *C09K 3/1436* (2013.01); *B24D 2203/00* (2013.01); *C09K 3/1409* (2013.01)

(56) References Cited

FOREIGN PATENT DOCUMENTS

| | | | | |
|---|---|---|---|---|
| JP | 2002-542057 | 12/2002 | | |
| JP | 2010-188522 | 9/2010 | | |
| JP | 2010188522 A | * 9/2010 | ............. | B24D 11/00 |
| JP | 2015-100895 | 6/2015 | | |

* cited by examiner

GRINDING MATERIAL AND PRODUCTION METHOD OF GRINDING MATERIAL

CROSS-REFERENCE TO RELATED APPLICATION

This application is a 371 application of International PCT application serial no. PCT/JP2016/065327, filed on May 24, 2016, which claims the priority benefit of Japan application no. 2015-123882, filed on Jun. 19, 2015. The entirety of each of the abovementioned patent applications is hereby incorporated by reference herein and made a part of this specification.

TECHNICAL FIELD

The present invention relates to a grinding material and a production method of the grinding material.

BACKGROUND ART

Recently, the refinement of electronic devices such as hard disks has progressed. As a substrate material for such electronic devices, glass is often used, taking into consideration of rigidity, shock resistance and heat resistance that serve in enabling miniaturization and thinning. The glass substrate is a fragile material, and scratches on a surface of the substrate cause a significant reduction in mechanical strength. Therefore, upon grinding of such a substrate, accuracy of planarization (hereinafter, may be referred to as "planarizing accuracy") with few scratches, and a superior grinding rate are required.

Typically, when the improvement of the planarizing accuracy after finishing is sought, a processing time period tends to become longer. In other words, the grinding rate and the planarizing accuracy are in a trade-off relation. Therefore, it is difficult to achieve an improvement of both the grinding rate and the planarizing accuracy. In this regard, in order to simultaneously improve the grinding rate and the planarizing accuracy, a grinding material is proposed which comprises a grinding portion comprising grinding grains and a filler dispersed therein (see Japanese Unexamined Patent Application (Translation of PCT Publication), Publication No. 2002-542057).

However, such a conventional grinding material, after having been used for grinding for a predetermined period of time, has a reduced grinding rate due to dulling of grinding grains and/or clogging of a surface of a grinding layer. In order to restore the grinding rate thus reduced, trimming of a surface of the grinding material for exposing a fresh surface, i.e., so-called dressing, is needed. Cleaning of the grinding material is also required before and after the dressing, and thus the dressing takes a substantial amount of time. Since grinding of a glass substrate is suspended during dressing, a grinding efficiency of the conventional grinding material is significantly reduced due to dressing being performed.

PRIOR ART DOCUMENT

Patent Document

Patent Document 1: Japanese Unexamined Patent Application (Translation of PCT Publication), Publication No. 2002-542057

SUMMARY OF THE INVENTION

Problems to be Solved by the Invention

The present invention was made in view of the foregoing disadvantages, and it is an object of the present invention to provide a grinding material which is superior in grinding rate and planarizing accuracy, with the grinding rate being less likely to be reduced over a relatively long period of time.

Means for Solving the Problems

According to an aspect of the invention made for solving the aforementioned problems, a grinding material comprises: a base; a grinding layer overlaid on a front face side of the base and comprising grinding grains and a binder for the grinding grains; and an adhesion layer overlaid on a back face side of the base, wherein the grinding grains are diamond grinding grains, a wear quantity of the grinding layer as determined by a Taber abrasion test is no less than 0.03 g and no greater than 0.18 g, and an Asker D hardness measured from a front face side of the grinding layer is no less than 80° and no greater than 98°.

Due to the Asker D hardness measured from the front face side of the grinding layer falling within the aforementioned range and the diamond grinding grains being used as the grinding grains, the grinding material is superior in grinding rate and planarizing accuracy by virtue of the hardness. Furthermore, in the grinding material, since the wear quantity of the grinding layer as determined by the Taber abrasion test falls within the aforementioned range, fresh grinding grains are easily exposed on the front face of the grinding layer, and the grinding rate is less likely to be reduced over a relatively long period of time. Therefore, the grinding material according to the aspect of the present invention enables a superior grinding rate and planarizing accuracy to be simultaneously attained and the frequency of dressing to be reduced, leading to a superior grinding efficiency.

The binder preferably contains an inorganic substance as a principal component. The binder containing the inorganic substance as a principal component is superior in retention of grinding grains and therefore the grinding grains are less likely to be separated. Therefore, due to containing the inorganic substance as a principal component, the grinding rate can be further increased.

The binder preferably contains a filler comprising an inorganic oxide as a principal component. By virtue of the binder containing the filler comprising the inorganic oxide as a principal component, an improvement in elasticity of the binder and easy control of wear of the grinding layer are enabled.

The grinding layer preferably comprises a plurality of grooves on a front face. By virtue of comprising the plurality of grooves on the front face of the grinding layer, a surface pressure to a glass substrate to be processed and the number of working points to be ground are enabled to be easily controlled, leading to a further enhancement of planarizing accuracy.

The grinding layer is preferably formed by a printing process. By virtue of forming the grinding layer by a printing process, grinding grains are easily exposed on the front face of the grinding layer during the formation of the grinding layer, whereby a superior grinding rate can be realized from the beginning of use.

Therefore, the grinding material according to the present aspect is suitably used for a flat grinding of a substrate made of glass or the like.

According to another aspect of the present invention made for solving the aforementioned problems, a production method of a grinding material comprising: a base; a grinding layer overlaid on a front face side of the base and comprising grinding grains and a binder for the grinding grains; and an adhesion layer overlaid on a back face side of the base, comprises the step of forming the grinding layer by printing with a grinding layer composition, wherein the grinding layer composition comprises diamond grinding grains, and the grinding layer is formed such that a wear quantity of the grinding layer as determined by a Taber abrasion test is no less than 0.03 g and no greater than 0.18 g, and an Asker D hardness measured from a front face side of the grinding layer is no less than 80° and no greater than 98°.

According to the production method of the grinding material, due to the grinding layer composition comprising the diamond grinding grains, and the grinding layer being formed such that the wear quantity of the grinding layer as determined by a Taber abrasion test falls within the aforementioned range and the Asker D hardness measured from the front face side of the grinding layer falls within the aforementioned range, the production of the grinding material is enabled which is superior in grinding rate and planarizing accuracy, with the grinding rate being less likely to be reduced over a relatively long period of time. Furthermore, according to the production method of the grinding material, the grinding layer is formed by printing with the grinding layer composition, the grinding grains are easily exposed on the front face of the grinding layer during the formation of the grinding layer. Therefore, according to the grinding material produced by the production method of the grinding material of the present invention, a superior grinding rate can be realized from the beginning of use. Moreover, according to the production method of the grinding material of the present invention, due to forming the grinding layer by printing with the grinding layer composition, a superior production efficiency is achieved.

The term "Asker D hardness" as referred to herein means a value measured by an Asker Durometer Type D pursuant to JIS-K-6253:2012 in a state in which a grinding material comprising a base, a grinding layer, and an adhesion layer is fixed to a support.

In addition, the term "wear quantity" as referred to herein means a value obtained by: providing a test piece (average diameter: 104 mm, average thickness: 300 µm); rotating the test piece 320 times by using a Taber abrasion tester under conditions involving a load of 4.9 N (500 gf) with a grinding wheel H-18; and measuring a difference in mass of the test piece before and after the 320 rotations. The term "principal component" as referred herein to means a component which is of the highest content, for example a component of which content is no less than 50% by mass.

Effects of the Invention

As explained in the foregoing, the grinding material according to the aspect of the present invention is superior in grinding rate and planarizing accuracy, with the grinding rate being less likely to be reduced over a relatively long period of time.

DESCRIPTION OF EMBODIMENTS

Hereinafter, embodiments of the present invention will be described with reference to the drawings as necessary.

Grinding Material

Figure 1A:
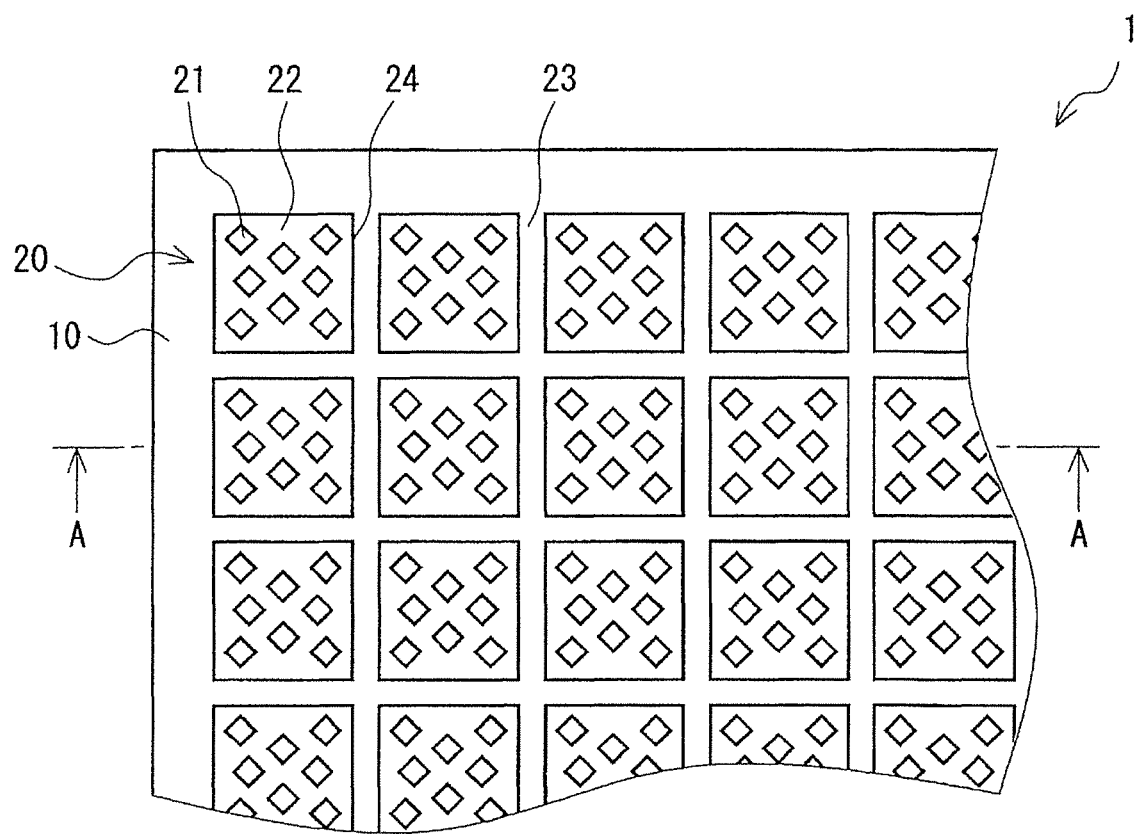
FIG. 1A is a schematic plan view illustrating a grinding material according to an embodiment of the present invention.
Figure 1B:
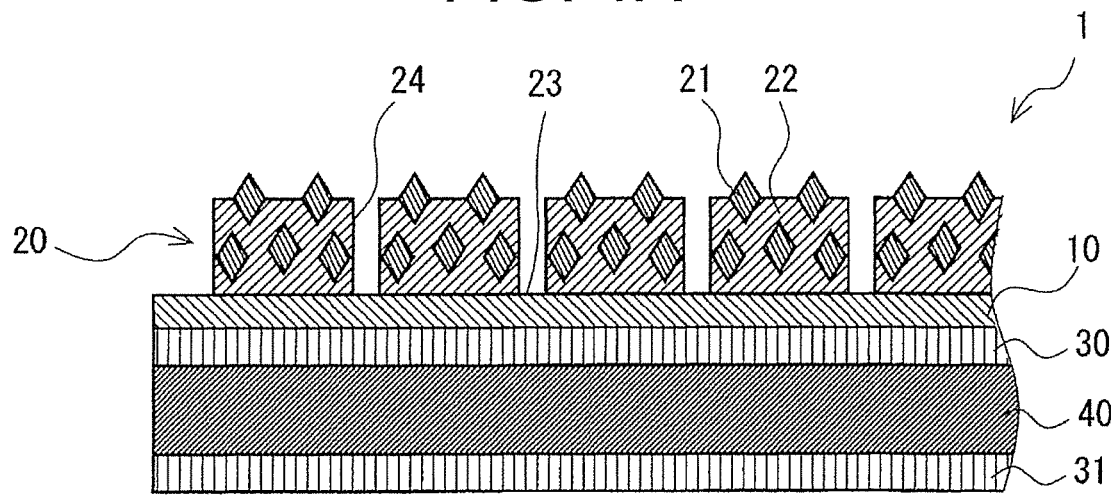
FIG. 1B is a schematic cross sectional view along the line A-A of FIG. 1A.

A grinding material 1 illustrated in FIGS. 1A and 1B includes a base 10, a grinding layer 20 overlaid on the front face side of the base 10, and an adhesion layer 30 overlaid on the back face side of the base 10. The grinding material 1 also includes a support 40 overlaid via the adhesion layer 30, and a second adhesion layer 31 overlaid on a back face side of the support 40.

Base

The base 10 is a member for supporting the grinding layer 20. The base 10 has a plate-like shape.

A material of the base 10 is not particularly limited and examples of the material include polyethylene terephthalate (PET), polypropylene (PP), polyethylene (PE), polyimide (PI), polyethylene naphthalate (PEN), aramid, aluminum, copper, and the like. Among these, aluminum having superior adhesive properties with the grinding layer 20 is preferred. Furthermore, a front face of the base 10 may be subjected to a treatment such as a chemical treatment, a corona treatment, and a primer treatment for enhancing the adhesive properties.

The base 10 may have flexibility or ductility. When the base 10 thus has flexibility or ductility, the grinding material 1 follows the surface profile of a glass substrate and accordingly the contact area between a grinding face thereof and the glass substrate increases, whereby the grinding rate is further improved. Examples of a material of the base 10 having flexibility include PET, PI, and the like. Furthermore, examples of a material of the base 10 having ductility include aluminum, copper, and the like.

The shape and size of the base 10 is not particularly limited, and may be, for example, in a square shape with a side of no less than 140 mm and no greater than 160 mm, or in a circular shape with an outer diameter of no less than 600 mm and no greater than 650 mm and an inner diameter of no less than 200 mm and no greater than 250 mm. Alternatively, a plurality of the bases 10 arranged in parallel on a plane may be supported by a single support.

The average thickness of the base 10 is not particularly limited and may be, for example, no less than 75 µm and no greater than 1 mm. When the average thickness of the base 10 is less than the lower limit, the strength or the planarity of the grinding material 1 may be insufficient. On the other hand, when the average thickness of the base 10 is greater than the upper limit, the grinding material 1 may be unnecessarily thick and the handling thereof may be difficult.

Grinding Layer

The grinding layer 20 includes grinding grains 21 and a binder 22 for the grinding grains 21. The grinding layer 20 also has a plurality of grooves 23 on the front face. The grinding layer 20 is divided into a plurality of regions (protruding portions 24) by the grooves 23.

The average thickness of the grinding layer 20 (the average thickness of only the protruding portions 24) is not particularly limited. The lower limit of the average thickness of the grinding layer 20 is preferably 100 µm, and more preferably 130 µm. The upper limit of the average thickness of the grinding layer 20 is preferably 1,000 µm, and more preferably 800 µm. When the average thickness of the grinding layer 20 is less than the lower limit, durability of the grinding layer 20 may be insufficient. On the other hand, when the average thickness of the grinding layer 20 is greater than the upper limit, the grinding material 1 may be unnecessarily thick, and thus, the handling thereof may be difficult.

The lower limit of the wear quantity of the grinding layer 20 as determined by the Taber abrasion test is preferably 0.03 g, more preferably 0.06 g, and still more preferably 0.12 g. Meanwhile, the upper limit of the wear quantity of the grinding layer 20 as determined by the Taber abrasion test is preferably 0.18 g, more preferably 0.17 g, and still more preferably 0.16 g. When the wear quantity of the grinding layer 20 as determined by the Taber abrasion test is less than the lower limit, fresh grinding grains 21 are less likely to be exposed on the surface of the grinding layer 20 during grinding of the glass substrate, leading to a reduction in the grinding rate. To the contrary, when the wear quantity of the grinding layer 20 as determined by the Taber abrasion test is greater than the upper limit, the grinding layer 20 may be worn out rapidly during the grinding of the glass substrate, and consequently the durability of the grinding material 1 may be insufficient.

The grinding layer 20 is preferably formed by a printing process. By virtue of thus forming the grinding layer 20 by the printing process, the grinding grains 21 are likely to be exposed on the surface of the grinding layer 20 during the formation of the grinding layer 20. Therefore, the grinding material 1 has a superior grinding rate from the beginning of use in the grinding of the glass substrate.

Grinding Grains

The grinding grains 21 are diamond grinding grains. The diamond grinding grains may be either monocrystalline or polycrystalline, and may have been subjected to a treatment such as Ni coating.

The lower limit of the average particle diameter of the grinding grains 21 is preferably 2 µm, and more preferably 5 µm. On the other hand, the upper limit of the average particle diameter of the grinding grains 21 is preferably 50 µm, and more preferably 40 µm. When the average particle diameter of the grinding grains 21 is less than the lower limit, the grinding rate during the grinding of the glass substrate may be insufficient. To the contrary, when the average particle diameter of the grinding grains 21 is greater than the upper limit, the planarizing accuracy in the grinding of the glass substrate may be insufficient. The term "average particle diameter" as referred to herein means the value at 50% in a cumulative particle size distribution curve based on the volume as measured by a laser diffraction method or the like (the particle diameter at 50%, D50).

The lower limit of the content of the grinding grains 21 with respect to the grinding layer 20 is preferably 3 volume %, and more preferably 5 volume %. On the other hand, the upper limit of the content of the grinding grains 21 with respect to the grinding layer 20 is preferably 55 volume %, and more preferably 35 volume %. When the content of the grinding grains 21 with respect to the grinding layer 20 is less than the lower limit, the grinding rate during the grinding of the glass substrate may be insufficient. To the contrary, when the content of the grinding grains 21 with respect to the grinding layer 20 is greater than the upper limit, the grinding layer 20 may not be able to retain the grinding grains 21.

Binder

A principal component of the binder 22 is not particularly limited, and may be an inorganic substance or a resin, for example.

The resin may be exemplified by polyurethane, polyphenol, epoxy, polyester, cellulose, ethylene copolymer, polyvinyl acetal, polyacryl, acryl ester, polyvinyl alcohol, polyvinyl chloride, polyvinyl acetate, polyamide, and the like. Among these, polyacryl, epoxy, polyester, and polyurethane, which are likely to ensure favorable adhesiveness to the base 10, are preferred. Furthermore, the resin may be at least partially crosslinked.

The inorganic substance may be exemplified by a silicate salt, a phosphate salt, a polyvalent metal alkoxide, and the like.

The principal component of the binder 22 is preferably the inorganic substance. Particularly, a silicate salt superior in retention of the grinding grains 21 is preferred. Examples of such a silicate salt include sodium silicate, potassium silicate, and the like.

Furthermore, when the principal component of the binder 22 is the inorganic substance, the binder 22 preferably contains a filler comprising an inorganic oxide as a principal component. When the binder 22 contains such a filler comprising the inorganic oxide as the principal component, elasticity of the binder 22 is improved, facilitating control of wear of the grinding layer 20.

Examples of the inorganic oxide include: oxides such as alumina, silica, cerium oxide, magnesium oxide, zirconia and titanium oxide; and complex oxides such as silica-alumina, silica-zirconia and silica-magnesia. These may be used either alone or in combination of two or more types thereof. Among these, alumina capable of providing a superior grinding force is preferred.

The average particle diameter of the filler depends on the average particle diameter of the grinding grains 21, but may be no less than 0.01 µm and no greater than 20 µm, for example. When the average particle diameter of the filler is less than the lower limit, the elasticity of the binder 22 due to the filler may be reduced, and consequently the control of wear of the grinding layer 20 may be insufficient. To the contrary, when the average particle diameter of the filler is greater than the upper limit, the filler may inhibit the grinding force of the grinding grains 21.

Furthermore, the average particle diameter of the filler is preferably smaller than the average particle diameter of the grinding grains 21. The lower limit of the ratio of the average particle diameter of the filler to the average particle diameter of the grinding grains 21 is preferably 0.1, and more preferably 0.2. Meanwhile, the upper limit of the ratio of the average particle diameter of the filler to the average particle diameter of the grinding grains 21 is preferably 0.8, and more preferably 0.6. When the ratio of the average particle diameter of the filler to the average particle diameter of the grinding grains 21 is less than the lower limit, the elasticity of the binder 22 due to the filler may be reduced, and consequently the control of wear of the grinding layer 20 may be insufficient. To the contrary, when the ratio of the average particle diameter of the filler to the average particle diameter of the grinding grains 21 is greater than the upper limit, the filler may inhibit the grinding force of the grinding grains 21.

Although the content of the filler with respect to the grinding layer 20 depends on the content of the grinding grains 21, the lower limit of the content of the filler with respect to the grinding layer 20 is preferably 15 volume %, and more preferably 30 volume %. Meanwhile, the upper limit of the content of the filler with respect to the grinding layer 20 is preferably 75 volume %, and more preferably 60 volume %. When the content of the filler with respect to the grinding layer 20 is less than the lower limit, the elasticity of the binder 22 due to the filler may be reduced, and consequently the control of wear of the grinding layer 20 may be insufficient. To the contrary, when the content of the filler with respect to the grinding layer 20 is greater than the upper limit, the filler may inhibit the grinding force of the grinding grains 21.

The binder 22 may further contain various types of auxiliary agents, additives, etc. such as a dispersant, a coupling agent, a surfactant, a lubricant, a defoaming agent, a colorant, and the like, appropriately according to a purpose.

Groove

The grooves 23 are provided on the front face of the grinding layer 20 in an equally spaced grid manner. In other words, the plurality of protruding portions 24 are regularly arranged in a block pattern. Furthermore, the bottom face of the grooves 23 that divide the protruding portions 24 is constituted of the front face of the base 10.

The lower limit of the average width of the grooves 23 is preferably 0.3 mm, and more preferably 0.5 mm. On the other hand, the upper limit of the average width of the grooves 23 is preferably 10 mm, and more preferably 8 mm. When the average width of the grooves 23 is less than the lower limit, a grinding powder generated by grinding may clog the groove 23. On the other hand, when the average width of the grooves 23 is greater than the upper limit, a scratch may be made on the glass substrate during grinding of the glass substrate.

The lower limit of the average area of the protruding portions 24 is preferably 1 mm$^2$, and more preferably 2 mm$^2$. On the other hand, the upper limit of the average area of the protruding portions 24 is preferably 150 mm$^2$, and more preferably 130 mm$^2$. When the average area of the protruding portions 24 is less than the lower limit, the protruding portion 24 may be detached from the base 10. To the contrary, when the average area of the protruding portions 24 is greater than the upper limit, the contact area of the grinding layer 20 with the glass substrate during grinding of the glass substrate may be so large that the grinding rate may be reduced due to friction resistance.

The lower limit of the area occupancy rate of the plurality of protruding portions 24 with respect to the entire grinding layer 20 is preferably 5%, and more preferably 10%. On the other hand, the upper limit of the area occupancy rate of the plurality of protruding portions 24 with respect to the entire grinding layer 20 is preferably 60%, and more preferably 55%. When the area occupancy rate of the plurality of protruding portions 24 with respect to the entire grinding layer 20 is less than the lower limit, a pressure applied during grinding is excessively concentrated on narrow protruding portions 24, and thus the protruding portions 24 may be detached from the base 10. To the contrary, when the area occupancy rate of the plurality of protruding portions 24 with respect to the entire grinding layer 20 is greater than the upper limit, the contact area of the grinding layer 20 with the glass substrate during grinding of the glass substrate may be so large that the grinding rate may be reduced due to friction resistance. It is to be noted that the concept of an entire area of the grinding layer encompasses an area of the grooves of a grinding layer.

Adhesion Layer

The adhesion layer 30 is a layer that fixes the grinding material 1 to the support 40 to be attached to a grinding apparatus.

An adhesive used for this adhesion layer 30 is not particularly limited but examples thereof include a reactive adhesive, an instantaneous adhesive, a hot melt adhesive, a tacky adhesive, and the like.

A tacky adhesive (pressure sensitive adhesive) is preferred as the adhesive used for this adhesion layer 30. When using a tacky adhesive as the adhesive used for the adhesion layer 30, since the grinding material 1 can be detached from the support 40 and replaced with another, the grinding material 1 and the support 40 can be readily recycled. Such a tacky adhesive is not particularly limited but examples thereof include an acrylic tacky adhesive, an acryl-rubber tacky adhesive, a natural rubber tacky adhesive, a synthetic rubber tacky adhesive such as a butyl rubber, a silicone tacky adhesive, a polyurethane tacky adhesive, and the like.

The lower limit of the average thickness of the adhesion layer 30 is 0.05 mm, and more preferably 0.1 mm. On the other hand, the upper limit of the average thickness of the adhesion layer 30 is preferably 0.3 mm, and more preferably 0.2 mm. When the average thickness of the adhesion layer 30 is less than the lower limit, the adhesive force may be insufficient, and thus the grinding material 1 may be detached from the support 40. On the other hand, when the average thickness of the adhesion layer 30 is greater than the upper limit, a too thick adhesion layer 30 may lead to a decrease of workability, for example, a difficulty may be brought about in cutting the grinding material 1 into a desired shape.

Support

The support 40 is overlaid on the back face side of the base 10 via the adhesion layer 30, and facilitates the handling of the grinding material 1.

A material for the support 40 is exemplified by: thermoplastic resins such as polypropylene, polyethylene, polytetrafluoroethylene and polyvinyl chloride; and engineering plastics such as polycarbonate, polyamide and polyethylene terephthalate. Due to using such a material for the support 40, the support 40 has flexibility and consequently enables the grinding material 1 to readily follow the surface profile of the glass substrate. As a result, a grinding face of the grinding material 1 is more likely to be in contact with the glass substrate, leading to a further improvement in the grinding rate.

The average thickness of the support 40 may be no less than 0.5 mm and no greater than 3 mm, for example. When the average thickness of the support 40 is less than the lower limit, the strength of the grinding material 1 may be insufficient. On the other hand, when the average thickness of the support 40 is greater than the upper limit, the attachment of the support 40 to a grinding apparatus may be difficult or the flexibility of the support 40 may be insufficient.

Second Adhesion Layer

The second adhesion layer 31 is a layer for attaching and fixing the grinding material 1 to the grinding apparatus.

A similar adhesive to that for the adhesion layer 30 may be used for the second adhesion layer 31. Also, the second adhesion layer 31 may have a similar average thickness to that of the adhesion layer 30.

Hardness of Grinding Material

The lower limit of the Asker D hardness of the grinding material 1 as measured from the front face side of the grinding layer 20 is preferably 80°, more preferably 82°, and still more preferably 92°. Meanwhile, the upper limit of the Asker D hardness of the grinding material 1 as measured from the front face side of the grinding layer 20 is preferably 98°, more preferably 97°, and still more preferably 96°. When the Asker D hardness of the grinding material 1 as measured from the front face side of the grinding layer 20 is less than the lower limit, the grinding rate during grinding of the grass substrate may be insufficient. Furthermore, the abutment of the grinding layer 20 to the glass substrate may be unstable due to deformation of the grinding layer 20, and the grinding rate is likely to vary for each grinding, leading to difficulty in determining the duration of grinding beforehand. To the contrary, when the Asker D hardness of the grinding material 1 as measured from the front face side of the grinding layer 20 is greater than the upper limit, the glass substrate may be, for example, chipped or broken during grinding of the glass substrate.

As explained in the foregoing, the grinding material 1 enables a superior grinding rate and planarizing accuracy to be simultaneously attained, with the grinding rate being less likely to be reduced. Therefore, the grinding material 1 can be suitably used for a flat grinding of a substrate made of glass or the like.

Production Method of Grinding Material

The grinding material 1 can be produced by the steps of: preparing a grinding layer composition; forming the grinding layer 20 by printing with the grinding layer composition; and overlaying the support 40 on the back face side of the base 10.

First, in the step of preparing a grinding layer composition, a grinding layer composition containing a forming material of the binder 22 containing an inorganic substance as a principal component, a filler, and diamond grinding grains 21 is provided as a coating liquid. Furthermore, a diluent such as water, alcohol or the like is added in order to control the viscosity and/or fluidity of the coating liquid.

Next, in the step of forming the grinding layer, the coating liquid provided in the step of preparing the grinding layer composition is used to form the grinding layer 20, which is constituted of a plurality of protruding portions 24 provided through dividing by the grooves 23, by a printing process on the front face of the base 10. In order to form the grooves 23, a mask having a shape corresponding to the shape of the grooves 23 is provided to print with the coating liquid through this mask. Examples of the printing process include screen printing, metal mask printing, and the like.

Then, the grinding layer 20 is formed through dehydrating by heating as well as hardening by heating of the printed coating liquid. More specifically, for example, the coating liquid is dried for at least 30 min at room temperature (25° C.), dehydrated by heating with heat of no less than 70° C. and no greater than 90° C. for at least 1 hour, and hardened with heat of no less than 140° C. and no greater than 160° C. in the range of no less than 2 hrs and no greater than 4 hrs, to form the binder 22.

A wear quantity of the grinding layer 20 as determined by the Taber abrasion test can be adjusted by the content of the filler in the step of preparing the grinding layer composition, for example. Specifically, in order to increase the wear quantity as determined by the Taber abrasion test, the content of the filler may be increased. Furthermore, the Asker D hardness of the grinding material 1 measured from the front face side of the grinding layer 20 can be adjusted by the average thickness of the grinding layer 20, for example. Specifically, in order to increase the Asker D hardness, the thickness of the grinding layer 20 may be increased. Through such adjustments, the production method of the grinding material enables formation of the grinding layer 20 in the step of forming the grinding layer, such that the Asker D hardness of the grinding material 1 measured from the front face side of the grinding layer 20 and a wear quantity of the grinding material 1 as determined by the Taber abrasion test fall within predetermined ranges, respectively.

Finally, in the step of overlaying the support, the support 40 is overlaid via the adhesion layer 30. Furthermore, the second adhesion layer 31 is attached onto the back face of the support 40. Accordingly, the production of the grinding material 1 is enabled.

Advantages

Due to the Asker D hardness measured from the front face side of the grinding layer 20 falling within a predetermined range and the diamond grinding grains being used as the grinding grains 21, the grinding material 1 of the embodiment of the present invention is superior in grinding rate and planarizing accuracy. Furthermore, since the grinding material 1 is formed such that the wear quantity of the grinding layer 20 as determined by the Taber abrasion test falls within a predetermined range, fresh grinding grains 21 are easily exposed on the front face of the grinding layer 20, and a grinding rate thereof is less likely to be reduced over a relatively long period of time. Therefore, the grinding material 1 enables a superior grinding rate and planarizing accuracy to be simultaneously attained, and a superior grinding efficiency to be realized owing to the reduced frequency of dressing.

Furthermore, the production method of a grinding material of the present invention is superior in production efficiency, since the grinding layer 20 can be formed by printing with the grinding layer composition.

Other Embodiments

The present invention is not limited to the aforementioned embodiments, and, in addition to the aforementioned embodiments, can be carried out in various modes with alterations and/or improvements being made.

Although the grooves are arranged in an equally spaced grid manner in the aforementioned embodiment, the grid spacing may not be equal. For example, the grid spacing can differ from each other in a vertical direction and a transverse direction. However, since anisotropy may incur if the spacing of the groove differs, the equally spaced manner is preferred.

Furthermore, the planar shape of the grooves may not be in a grid manner, and may be a shape in which polygons other than quadrangles are repeated, a circular shape, a shape having a plurality of parallel lines, and the like, or may be a concentric shape.

In addition, although the case in which the grinding layer has the plurality of grooves is described in the aforementioned embodiment, the grooves are not an essential constituent element, and may be omitted. For example, the grinding material may be formed to have a structure in which a grinding layer is overlaid uniformly on the surface of the base.

Although the procedure of using a mask, as the printing process of the grinding layer, for forming the grinding layer and the groove simultaneously is described in the aforementioned embodiment, the groove may be formed by etching processing, laser processing, or the like, after the printing with the grinding layer composition on the entire front face of the base to form the grinding layer.

In addition, although the case of forming the grinding layer with the printing process is described in the aforementioned embodiment, the grinding layer may also be formed by other processes such as spray coating and bar coating.

Furthermore, although the case of providing the second adhesion layer on the back face side of the support is described in the aforementioned embodiment, the adhesion layer is not an essential constituent element and may be omitted. Moreover, the support is not an essential constituent element either, and may be omitted similarly to the second adhesion layer.

EXAMPLES

Hereinafter, the present invention will be explained in more detail by way of Examples and Comparative Examples, but the present invention is not limited to the following Examples.

Example 1

Diamond grinding grains ("LS605FN" available from LANDS Supergrindings, Co.) were provided, and the average particle diameter was measured by using "Microtrac MT3300EXII" available from NIKKISO CO., LTD. The average particle diameter of the diamond grinding grains was 7.5 μm. It should be noted that the type of diamond of the grinding grains was treated diamond that had been subjected to 55% by mass nickel coating.

A coating liquid was obtained by: mixing a silicate salt as a binder ("No. 3 silicate soda" available from Fuji Chemical Industries Co., Ltd.), the aforementioned diamond grinding grains, and alumina as a filler ($Al_2O_3$, "LA4000" available from Pacific Rundum Co., Ltd., average particle diameter: 4 μm); and preparing the mixture so that the content of the diamond grinding grains with respect to the grinding layer was 30 volume % and the content of the filler with respect to the grinding layer was 40 volume %.

An aluminum plate having the average thickness of 300 μm was provided as a base, and a grinding layer having grid grooves were formed by printing on the front face of the base using the coating liquid. It should be noted that the grooves were formed on the grinding layer by using a mask corresponding to the grooves as a printing pattern. The protruding portions which were a plurality of regions formed by having the surface of the grinding layer divided by the grooves were in a square shape with a side of 3 mm in a planar view, and the grinding layer had an average thickness of 300 μm. The aforementioned protruding portions were regularly arranged in a block pattern, and the area occupancy rate of the protruding portions with respect to the entire grinding layer was 36%. It should be noted that the coating liquid was dried at room temperature (25° C.) for 30 mins or longer, heated and dehydrated at 80° C. for 1 hour or longer, and then hardened at 150° C. for no less than 2 hrs and no greater than 4 hrs.

Furthermore, as a support for supporting the base and fixing it to a grinding apparatus, a rigid vinyl chloride resin plate having an average thickness of 1 mm ("SP770" available from TAKIRON Co., LTD.) was used to laminate the back face of the base and the front face of the support as well as the back face of the support and a surface plate of a grinder (described later), by a tacky adhesive having an average thickness of 130 μm. A double sided tape ("#5605HGD" available from SEKISUI CHEMICAL CO., LTD.) was used as the tacky adhesive. Accordingly, the grinding material of Example 1 was obtained.

Example 2

A grinding material of Example 2 was obtained in a similar manner to Example 1 except that, in the formation of the grinding layer of Example 1, the area occupancy rate of the protruding portions with respect to the entire grinding layer was 25%.

Example 3

Diamond grinding grains ("LS605EN" available from LANDS Supergrindings, Co.) were provided, and the average particle diameter was measured by using "Microtrac MT3300EXII" available from NIKKISO CO., LTD. The average particle diameter of the diamond grinding grains was 35 μm. It should be noted that the type of diamond of the grinding grains was treated diamond that had been subjected to 55% by mass nickel coating.

A coating liquid was obtained by: mixing a silicate salt as a binder ("No. 3 silicate soda" available from Fuji Chemical Industries Co., Ltd.), the aforementioned diamond grinding grains, and alumina as a filler ($Al_2O_3$, "LA1200" available from Pacific Rundum Co., Ltd., average particle diameter: 12 μm); and preparing the mixture so that the content of the diamond grinding grains with respect to the grinding layer was 5 volume % and the content of the filler with respect to the grinding layer was 71 volume %.

A grinding material of Example 3 was obtained in a similar manner to Example 1 except that the aforementioned coating liquid was used.

Example 4

A grinding material of Example 4 was obtained in a similar manner to Example 3 except that, in the formation of the grinding layer of Example 3, the average thickness of the grinding layer was 600 μm.

Example 5

Diamond grinding grains ("EDD-X-UM" available from EID) were provided, and the average particle diameter was measured by using "Microtrac MT3300EXII" available from NIKKISO CO., LTD. The average particle diameter of the diamond grinding grains was 11 μm. It should be noted that the type of diamond of the grinding grains was polycrystalline diamond.

A coating liquid was obtained by: mixing a silicate salt as a binder ("No. 3 silicate soda" available from Fuji Chemical Industries Co., Ltd.), the aforementioned diamond grinding grains, and alumina as a filler ($Al_2O_3$, "LA4000" available from Pacific Rundum Co., Ltd., average particle diameter: 4 μm); and preparing the mixture so that the content of the diamond grinding grains with respect to the grinding layer was 5 volume and the content of the filler with respect to the grinding layer was 62.5 volume %.

A grinding material of Example 5 was obtained in a similar manner to Example 1 except that the aforementioned coating liquid was used.

Comparative Example 1

A grinding material of Comparative Example 1 was obtained in a similar manner to Example 3 except that, in the preparation of the coating liquid of Example 3, a potassium silicate as a binder ("No. 1 potassium silicate" available from Fuji Chemical Industries Co., Ltd.) was prepared by diluting with water so that the content of the diamond grinding grains with respect to the grinding layer was 5 volume % and the content of the filler with respect to the grinding layer was 71 volume %.

Comparative Example 2

A grinding material of Comparative Example 2 was obtained in a similar manner to Example 3 except that an ultra-low hardness gel sheet ("G5VU2" available from KITAGAWA INDUSTRIES CO., LTD.) was used for the adhesion between the back face of the base and the front face of the support.

Comparative Example 3

A grinding material of Comparative Example 3 was obtained in a similar manner to Example 3 except that, in the preparation of the coating liquid of Example 3, the coating liquid was prepared such that the content of the filler with respect to the grinding layer was 50 volume %.

Comparative Example 4

A grinding material of Comparative Example 4 was obtained in a similar manner to Example 3 except that, in the preparation of the coating liquid of Example 3, the content of the filler with respect to the grinding layer was prepared to be 89 volume %.

Comparative Example 5

A coating liquid was obtained by: mixing a silicate salt ("No. 3 silicate soda" available from Fuji Chemical Industries Co., Ltd.), alumina as grinding grains and a filler ($Al_2O_3$, "LA8000" available from Pacific Rundum Co., Ltd., average particle diameter: 30 μm); and preparing the mixture such that the content of the alumina with respect to the grinding layer was 73 volume %.

A grinding material of Comparative Example 5 was obtained in a similar manner to Example 1 except that the aforementioned coating liquid was used.

Evaluation Procedures

The wear evaluation by the Taber abrasion test, the hardness measurement, and determination of the grinding rate were carried out by using the grinding materials obtained from Examples 1 to 5 and Comparative Examples 1 to 5. The evaluation results are shown in Table 1.

Wear Evaluation by Taber Abrasion Test

In the wear evaluation by the Taber Abrasion test, the wear quantity (g) was obtained by: providing a test piece (average diameter: 104 mm, average thickness: 300 μm) from each of the grinding materials obtained from Examples 1 to 5 and Comparative Examples 1 to 5; rotating and wearing the test piece 320 times by using a Taber abrasion tester under conditions involving a load of 4.9 N (500 gf) with a grinding wheel H-18; and measuring a difference in mass (g) of the test piece before and after the 320 rotations.

Asker D Hardness Measurement

The Asker D hardness measurement from the front face side of the grinding layer was carried out for each of the grinding materials of Examples 1 to 5 and Comparative Examples 1 to 5 prior to the lamination to a surface plate, i.e., in the state in which the support was laminated on the back face of the base via the first adhesion layer and the second adhesion layer was further laminated on the back face of the support. For the measurement, an Asker Durometer ("type D" available from KOBUNSHI KEIKI CO., LTD.) was used.

Grinding Rate

The grinding rate was calculated by, for each grinding of the glass substrate, dividing a weight change (g) of the substrate after being ground, by the surface area ($cm^2$) of the glass substrate, the specific gravity ($g/cm^3$) of the substrate, and a grinding time period (minute). It should be noted that the grinding conditions of the glass substrate were as follows.

Grinding Conditions

For the glass substrate, three pieces of soda-lime glass each having a diameter of 6.25 cm and a specific gravity of 2.4 (available from Hiraoka Special Glass Mfg. Co., Ltd.) were used. For grinding, a commercially available double side grinder ("EJD-5B-3W" available from Engis Japan Corporation) was used. A carrier of the double side grinder is an epoxy glass having a thickness of 0.4 mm. The grinding was performed five times in succession and each grinding was performed for 15 minutes under the conditions involving the grinding pressure of 150 $g/cm^2$, the number of rotations of the upper surface plate of 60 rpm, the number of rotations of the lower surface plate of 90 rpm, and the number of rotations of the SUN gear of 10 rpm. During this procedure, "LAP-P-32" available from PALACE CHEMICAL CO. LTD. was supplied at a rate of 120 cc per minute as a coolant.

TABLE 1

| | Wear quantity (g) | Hardness (°) | Grinding rate (μm/min) | | | | | Grinding rate ratio (Fifth grinding/First grinding) |
| --- | --- | --- | --- | --- | --- | --- | --- | --- |
| | | | First grinding | Second grinding | Third grinding | Fourth grinding | Fifth grinding | |
| Example 1 | 0.10 | 85 | 10.2 | 9.9 | 10.1 | 10.3 | 10.1 | 99% |
| Example 2 | 0.09 | 85 | 8.9 | 9.2 | 8.7 | 8.9 | 9 | 101% |
| Example 3 | 0.15 | 83 | 75 | 77 | 73 | 76 | 75 | 100% |
| Example 4 | 0.15 | 95 | 104 | 108 | 103 | 102 | 104 | 100% |
| Example 5 | 0.05 | 90 | 12.2 | 11.9 | 11.5 | 11.7 | 11.6 | 95% |
| Comparative Example 1 | 0.19 | 93 | 43 | 43 | 30 | 24 | (19) | 44% |
| Comparative Example 2 | 0.15 | 78 | 75 | 44 | 52 | 45 | 34 | 45% |
| Comparative Example 3 | 0.02 | 81 | 36 | 31 | — | — | — | — |

TABLE 1-continued

|  | Wear quantity (g) | Hardness (°) | Grinding rate (μm/min) | | | | | Grinding rate ratio (Fifth grinding/First grinding) |
|---|---|---|---|---|---|---|---|---|
|  |  |  | First grinding | Second grinding | Third grinding | Fourth grinding | Fifth grinding |  |
| Comparative Example 4 | 1.20 | 92 | Grinding layer-worn out | | | | | — |
| Comparative Example 5 | — | 83 | 0.3 | — | — | — | — | — |

It is to be noted that the symbol "—" for the wear quantity in Table 1 indicates that the measurement was not conducted. The description "Grinding layer-worn out" for the grinding rate indicates a failure to perform the measurement due to the grinding layer being worn out. The numeral "(19)" for the fifth grinding of Comparative Example 1 indicates that it was confirmed that the grinding layer was worn out when the fifth grinding was completed. In addition, the symbol "—" for the grinding rate of Comparative Examples 3 and 5 indicates that the measurement was not conducted. Since Comparative Example 3 exhibited a lower grinding rate than that of Example 3 and the grinding rate ratio of the second grinding to the first grinding was decreased to as low as 86%, subsequent measurement was not conducted. Furthermore, since Comparative Example 5 exhibited an extremely low grinding rate in the first grinding, subsequent measurement was not conducted. Moreover, the symbol "—" for the grinding rate ratio in Table 1 indicates a failure to calculate a grinding rate ratio by dividing the grinding rate in the fifth grinding by the grinding rate in the first grinding due to there being no grinding results for the first grinding or/and the fifth grinding.

Table 1 shows that the grinding rate ratios of the grinding materials of Examples 1 to 5 were greater than the grinding rate ratios of the grinding materials of Comparative Examples 1 to 5, and were close to 100%. In other words, a grinding rate equivalent to that in the first grinding was still obtained in the fifth grinding. Therefore, it was revealed that, for the grinding materials of Examples 1 to 5, the grinding rates were maintained even in the fifth grinding. Furthermore, comparison of Examples 3 and 4 with Comparative Example 2, which exhibited equivalent wear quantities, revealed that Examples 3 and 4 exhibited greater grinding rates. It is therefore considered that, for the grinding materials of Examples 1 to 5, the grinding rates were great and the grinding rates were maintained even in the fifth grinding, due to the wear quantity of the grinding layer as determined by the Taber abrasion test falling within a predetermined range as well as the Asker D hardness of the grinding material measured from the front face side of the grinding layer falling within a predetermined range.

Whereas, for the grinding materials of Comparative Examples 1 and 4, since the wear quantities of the grinding layers as determined by the Taber abrasion test were greater than the predetermined range, it is considered that the grinding layers were worn excessively, leading to attrition of the grinding layers. To the contrary, for the grinding material of Comparative Example 3, since the wear quantity of the grinding layer as determined by the Taber abrasion test was smaller than the predetermined range, it is considered that fresh grinding grains were not easily exposed on the front face of the grinding layer during grinding of the glass substrate, leading to the reduction in the grinding rate. Furthermore, since the Asker D hardness measured from the front face side of the grinding layer was smaller than the predetermined range, the abutment of the grinding layer to the glass substrate were unstable due to deformation of the grinding layer. Therefore, it is considered that the grinding rate of the grinding material of Comparative Example 2 largely varied for each grinding. Furthermore, it is also considered that the grinding rate of the grinding material of Comparative Example 5 was low due to the grinding grains not being diamond grinding grains.

From the foregoing, it is concluded that the grinding materials of Examples 1 to 5, in which: the diamond grinding grains were used as the grinding grains; the wear quantity of the grinding layer as determined by the Taber abrasion test fell within the predetermined range; and the Asker D hardness of the grinding material measured from the front face side of the grinding layer fell within the predetermined range, were superior in grinding rate, with the grinding rate being less likely to be reduced over a relatively long period of time.

INDUSTRIAL APPLICABILITY

The grinding material according to the embodiment of the present invention is superior in grinding rate and planarizing accuracy, with the grinding rate being less likely to be reduced over a relatively long period of time. Therefore, the grinding material according to the aspect of the present invention can be suitably used for a flat grinding of a substrate made of glass or the like.

The invention claimed is:

1. A grinding material comprising:
   a base;
   a grinding layer overlaid on a front face side of the base and comprising grinding grains and a binder for the grinding grains; and
   an adhesion layer overlaid on a back face side of the base, wherein
   the grinding grains are diamond grinding grains,
   the binder comprises an inorganic substance as a principal component,
   the binder further comprises a filler comprising an inorganic oxide as a principal component,
   a content of the filler with respect to the grinding layer is no less than 15 volume % and no greater than 75 volume %,
   a wear quantity of the grinding layer as determined by a Taber abrasion test is no less than 0.03 g and no greater than 0.18 g, and
   an Asker D hardness measured from a front face side of the grinding layer is no less than 82° and no greater than 98°.

2. The grinding material according to claim 1, wherein the grinding layer comprises a plurality of grooves on a front face.

3. The grinding material according to claim 1, wherein the grinding layer is formed by a printing process.

4. The grinding material according to claim 1, wherein the grinding material is used in a flat grinding of a substrate.

5. A production method of a grinding material comprising: a base; a grinding layer overlaid on a front face side of the base and comprising grinding grains and a binder for the grinding grains; and an adhesion layer overlaid on a back face side of the base, the method comprising forming the grinding layer by printing with a grinding layer composition, wherein the grinding layer composition comprises diamond grinding grains; a forming material of the binder comprises an inorganic substance as a principal component; and a filler comprising an inorganic oxide as a principal component, and the grinding layer is formed such that a wear quantity of the grinding layer as determined by a Taber abrasion test is no less than 0.03 g and no greater than 0.18 g, an Asker D hardness measured from a front face side of the grinding layer is no less than 82° and no greater than 98°, and a content of the filler with respect to the grinding layer is no less than 15 volume % and no greater than 75 volume %.

* * * * *